United States Patent
Sahu et al.

(10) Patent No.: US 10,231,020 B2
(45) Date of Patent: Mar. 12, 2019

(54) SPORTS RECOMMENDER SYSTEM UTILIZING CONTENT BASED FILTERING

(71) Applicant: The DIRECTV Group, Inc., El Segundo, CA (US)

(72) Inventors: Ashok Sahu, Kirkland, WA (US); Raymond Hsu, Irvine, CA (US); Charles Bradley Rice, Carlsbad, CA (US)

(73) Assignee: The DirecTV Group, Inc, El Segundo, CA (US)

( * ) Notice: Subject to any disclaimer, the term of this patent is extended or adjusted under 35 U.S.C. 154(b) by 0 days.

(21) Appl. No.: 15/596,773

(22) Filed: May 16, 2017

(65) Prior Publication Data

US 2018/0338180 A1   Nov. 22, 2018

(51) Int. Cl.
| | |
|---|---|
| G06F 17/30 | (2006.01) |
| H04N 21/45 | (2011.01) |
| H04N 21/442 | (2011.01) |
| H04N 21/454 | (2011.01) |
| H04N 21/466 | (2011.01) |
| H04N 21/472 | (2011.01) |
| H04N 21/482 | (2011.01) |

(52) U.S. Cl.
CPC ..... *H04N 21/4668* (2013.01); *G06F 17/3053* (2013.01); *G06F 17/3082* (2013.01); *H04N 21/44204* (2013.01); *H04N 21/454* (2013.01); *H04N 21/4532* (2013.01); *H04N 21/47214* (2013.01); *H04N 21/4826* (2013.01)

(58) Field of Classification Search
CPC ......... H04N 21/4668; H04N 21/44204; H04N 21/4532; H04N 21/454; H04N 21/4826
See application file for complete search history.

(56) References Cited

U.S. PATENT DOCUMENTS

| | | | |
|---|---|---|---|
| 6,651,253 B2 | 11/2003 | Dudkiewicz et al. | |
| 7,434,244 B2 | 10/2008 | Popov et al. | |
| 7,577,645 B2 | 8/2009 | Yamamoto et al. | |
| 8,359,322 B2 | 1/2013 | Yamamoto et al. | |
| 8,566,855 B2 | 10/2013 | Wong et al. | |
| 8,925,007 B2 | 12/2014 | Packard et al. | |
| 9,348,898 B2 | 5/2016 | Nice et al. | |
| 9,357,266 B2 | 5/2016 | Garcia | |

(Continued)

FOREIGN PATENT DOCUMENTS

| | | |
|---|---|---|
| CN | 102752663 A | 10/2012 |
| EP | 1193976 A2 | 4/2002 |
| WO | WO 2012/148770 A2 | 11/2012 |

OTHER PUBLICATIONS

Hsu et al.; "AIMED—A personalized TV Recommendation System"; European Conf. on Interactive Television; 2007; p. 166-174.

(Continued)

*Primary Examiner* — Nasser M Goodarzi
*Assistant Examiner* — Adil Ocak
(74) *Attorney, Agent, or Firm* — Baker & Hostetler LLP

(57) ABSTRACT

A method includes receiving a request for sports programming recommendation, responsive to the receiving step, determining an upcoming program vector and a weighted historical vector, performing a similarity calculation comparing the upcoming program vector and the weighted historical vector to derive a recommendation score, and generating a recommendation based on the recommendation score.

19 Claims, 6 Drawing Sheets

(56) References Cited

U.S. PATENT DOCUMENTS

| | | | |
|---|---|---|---|
| 9,407,854 B2 | 8/2016 | Ellis et al. | |
| 9,451,316 B2 | 9/2016 | Leong et al. | |
| 9,503,791 B2 | 11/2016 | Pangilinan et al. | |
| 9,542,649 B2 | 1/2017 | Su | |
| 2003/0208755 A1 | 11/2003 | Zimmerman | |
| 2007/0157246 A1 | 7/2007 | Phillips | |
| 2007/0186243 A1 | 8/2007 | Pettit et al. | |
| 2008/0114754 A1* | 5/2008 | Karasudani | H04N 7/17318 |
| 2008/0134043 A1 | 6/2008 | Georgis et al. | |
| 2009/0228424 A1* | 9/2009 | Mori | H04H 60/31 706/54 |
| 2010/0235313 A1 | 9/2010 | Rea et al. | |
| 2012/0204201 A1 | 8/2012 | Cassidy et al. | |
| 2012/0331494 A1* | 12/2012 | Pontual | H04N 21/44222 725/9 |
| 2013/0047176 A1* | 2/2013 | Charania | G06F 17/30846 725/14 |
| 2013/0346875 A1 | 12/2013 | Klein et al. | |
| 2014/0082645 A1 | 3/2014 | Stern et al. | |
| 2015/0296258 A1 | 10/2015 | Morten | |
| 2016/0182954 A1 | 6/2016 | Nguyen et al. | |
| 2016/0371274 A1 | 12/2016 | Ng et al. | |

OTHER PUBLICATIONS

Ramos et al.; "Recommendation in the Digital TV Domain: an Architecture based on Textual Description Analysis"; SEKE; 2015; 6 pages.

Pazzani et al.; "Content-Based Recommendation Systems"; The Adaptive Web; 2007; p. 325-341.

Xiang et al.; Time-dependent Models in Collaborative Filtering based Recommender System; IEEE/WIC/ACM Int'l Conf. on Web Intelligence and Intelligent Agent Technology Workshops; 2009; p. 450-457.

Vinagre, Joao; "Time-aware collaborative filtering: a review"; Doctoral Symposium in Informatics Engineering; 12 pages.

Zhang, Yun; "Exploiting Latent Information in Recommender Systems"; Victoria University of Wellington; Thesis; 246 pages.

* cited by examiner

SPORTS RECOMMENDER SYSTEM UTILIZING CONTENT BASED FILTERING

TECHNICAL FIELD

Embodiments of the present inventions relate to methods and systems for recommending content to customers, and more particularly, to methods and systems for recommending sports programming.

BACKGROUND

There have been past systems which provide recommendations. These previous systems typically capture past viewing events which are stored and recommendations for future viewing events are based on the past viewing events. As such, most sports viewing recommendations are made based on history only without consideration of user changes, time since last viewed and weighting of factors otherwise important to the user. As such, there is a need to create a sports programming recommendation system that adjusts the recommendations based on a variety of factors important to the user.

SUMMARY

The present disclosure is directed to a method including receiving a request for sports programming recommendation, responsive to the receiving step, determining an upcoming program vector and a weighted historical vector, performing a similarity calculation comparing the upcoming program vector and the weighted historical vector to derive a recommendation score; and generating a recommendation based on the recommendation score. The method may further include determining a plurality of upcoming program vectors and wherein the performing step includes comparing each of the plurality of upcoming program vectors to the weighed historical vectors and the generating step includes generating a plurality of recommendation scores. The method may further include ranking the plurality of recommendation scores and the recommendation comprises recommending a highest of the plurality of recommendation scores.

In an aspect, the method may further include identifying a genre for each of a plurality of upcoming programs and determining an upcoming program vector for each of the plurality of upcoming programs and wherein the performing steps includes comparing the plurality of upcoming program vectors to the weighted historical vector and the generating step includes generating a plurality of recommendation scores. In an aspect, the method may further include determining a percentage for each genre watched based on an amount of viewing time for each genre compared to a total viewing time for all genres and ranking each genre in accordance with the percentage. The recommendation score may be used to rank upcoming programs within each genre. The number of recommendations for each genre may be determined based on a total number of recommendations and the percentage.

In an aspect, the method may further include displaying a total number of recommendations wherein each upcoming program is ranked according to the genre and the recommendation score within each genre. In an aspect, the method may further include applying a decay factor to each watched program based on the time since the watched program was viewed and using the decay factor to determine the weighted historical vector.

The present disclosure is also directed to a server including an input/output system for communicatively coupling the server to an input device and a storage source, a processor communicatively coupled to the input/output system, and memory storing instructions that cause the processor to effectuate operations, the operations including receiving a request for sports programming recommendation, responsive to the receiving step, determining an upcoming program vector and a weighted historical vector, performing a similarity calculation comparing the upcoming program vector and the weighted historical vector to derive a recommendation score, and generating a recommendation based on the recommendation score. The operations may further include determining a plurality of upcoming program vectors and wherein the performing step includes comparing each of the plurality of upcoming program vectors to the weighed historical vectors and the generating step includes generating a plurality of recommendation scores. The operations may further include ranking the plurality of recommendation scores and the recommendation comprises recommending a highest of the plurality of recommendation scores. In an aspect, the operations may further include identifying a genre for each of a plurality of upcoming programs and determining an upcoming program vector for each of the plurality of upcoming programs and wherein the performing steps includes comparing the plurality of upcoming program vectors to the weighted historical vector and the generating step includes generating a plurality of recommendation scores.

In an aspect, the operations may further include determining a percentage for each genre watched based on an amount of viewing time for each genre compared to a total viewing time for all genres and ranking each genre in accordance with the percentage and wherein the recommendation score is used to rank upcoming programs within each genre. The number of recommendations for each genre may be determined based on a total number of recommendations and the percentage. In an aspect, the operations may further include displaying a total number of recommendations wherein each upcoming program is displayed according to the genre and the recommendation score within each genre.

The present disclosure is also directed to a method including determining a total number of upcoming programs to be displayed, calculating a percentage based on a genre associated with each of the upcoming programs and historical minutes watched of each genre, allocating a number of upcoming programs per genre to be displayed per genre based on the percentage, and displaying the total number of upcoming programs ranked in accordance with the historical minutes watched of each genre. The method may further include creating an upcoming program vector for each of the upcoming programs and a weighted historical vector and performing a similarity calculation comparing each of the upcoming program vectors to the weighted historical vector to generate a recommendation score. In an aspect, the recommendations scores are ranked highest to lowest within each genre to establish a genre ranking and the displaying step comprises displaying the number of upcoming programs per genre in accordance with the percentage and the genre ranking.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Overview.

The present disclosure may include systems and methods for a recommendation system that provides sports programming recommendation. The method will take viewed programs for a customer account and turn them into vectors that can be compared to vectors for programs available in the two week guide. Using a similarity measure for the vectors, a recommendation will be provided for the account. Programs may be referenced by a unique content ID. The present disclosure will be described as a system and method for sports programming recommendations, but the disclosure may be applicable to other types of programming recommendations and as such, shall not be limited as such.

As described in more detail below, every sports event program has factors that may be used to describe the sporting event and any program in the viewing history or upcoming two week electronic program guide may be represented by a list of sport factors. These factors may fall into the following three categories: (1) sports team, i.e., a team like the LA Kings or an individual player like Tiger Woods for golf; (2) sports league/division/franchise; i.e. MLB, National League East or US Open for Tennis or Golf, or NASCAR Sprint cup; and (3) sports genre, i.e., the usual TMS genre for the sport such as basketball, tennis, and golf. Within each of these categories there may be a list of individual factors for the watched teams, leagues and genre. Every program in both the user's viewing history and also in the two week program guide of future programs may have a list of these factors associated therewith. Each specific factor like the team LA Kings will be assigned an index with in the vector. For viewing history the value at a particular index will represent the weighted viewing time in minutes for the time the account watched that factor. For programs in the two week guide a 1 or a zero in the index position will indicate if that factor is present for the upcoming program. These factors may be further weighted and then a score calculated that maps the viewing history to upcoming programs to provide recommendations. Further displaying the recommendations by the proportion of time for which each sports genre is watched may be used to display the recommended sports programs.

System Environment.

Figure 1:
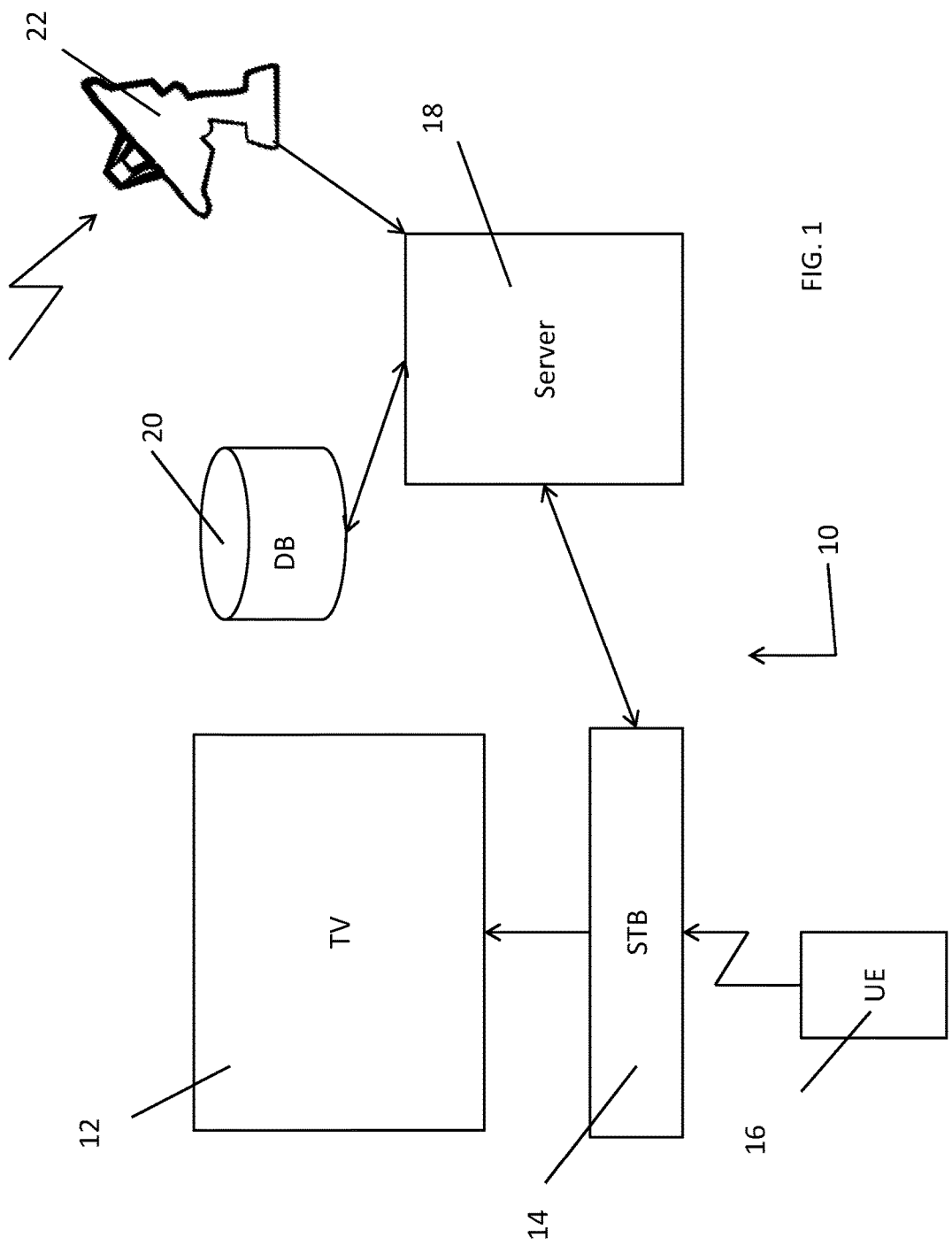
FIG. 1 is a schematic representation of an exemplary system environment in which the methods and systems of the present disclosure may be implemented.

Illustrated in FIG. 1 is a schematic representation of an exemplary system 10 environment in which embodiments of the present disclosure may operate. In the exemplary system 10, there is shown a television 12 as a video output of an entertainment system 10. While the television 12 is shown in an exemplary system, those skilled in the art will understand that the television 12 may be any type of video output, including but not limited to, video outputs associated with a tablet, smartphone, personal computer, LCD, or any other video output display. The television screen 12 is in communication with a set-top box ("STB") 14 which may be controlled by user equipment ("UE") 16 and which STB 14 may be in communication with server 18. It will be understood that STB 14 may contain a variety of functions controlled by and accessed by UE 16. Alternatively, the present disclosure does not require a STB 14 in order for system 10 to be operational and the UE 16 may be in direct communication with both television 12 and server 18.

The UE 16 may, for example, be a traditional remote control for a STB 14 having a proprietary operating system and application and physical interfaces particular to a manufacturer or service provider. Alternatively, UE 16 may be a smartphone, tablet or personal computer configured with an operating system which may, for example, be one of Apple's iOS, Google's Android, Microsoft Windows Mobile, or any other smartphone operating system or computer operating system or versions thereof. The UE 16 may control user input functions, including, but not limited to, selection and control of channel, movies, recordings, applications and other functions. The UE 16 may provide the ability for a user to input preference data, billing information, profile information, friends, likes and dislikes, or other inputs that enable or personalize the functions available to a user.

The UE 16 may have a communication interface for a wireless or wired communication system. In the exemplary configuration of FIG. 1, there is shown a wireless interface to a set-top box 14. The UE 16 and/or STB 14 may also have other communication interfaces, including but not limited to cellular communication system including 3G, 46 LTE, and 5G, WiFi, LAN, WiLan or any other communication system compatible with the UE 16 and/or STB 14.

The UE 16 may be in communication with an application server 18. The functionality included in the disclosure may reside either or the UE 16 or the application server 18 or a combination thereof. Such designation of functionality between the UE 16 and application server 18 may be a design choice or based on user experience, performance, cost, or any other factor. The allocation of functionality between UE 16 and application server 18 is exemplary only and non-limiting in scope of the present disclosure.

Figure 2:
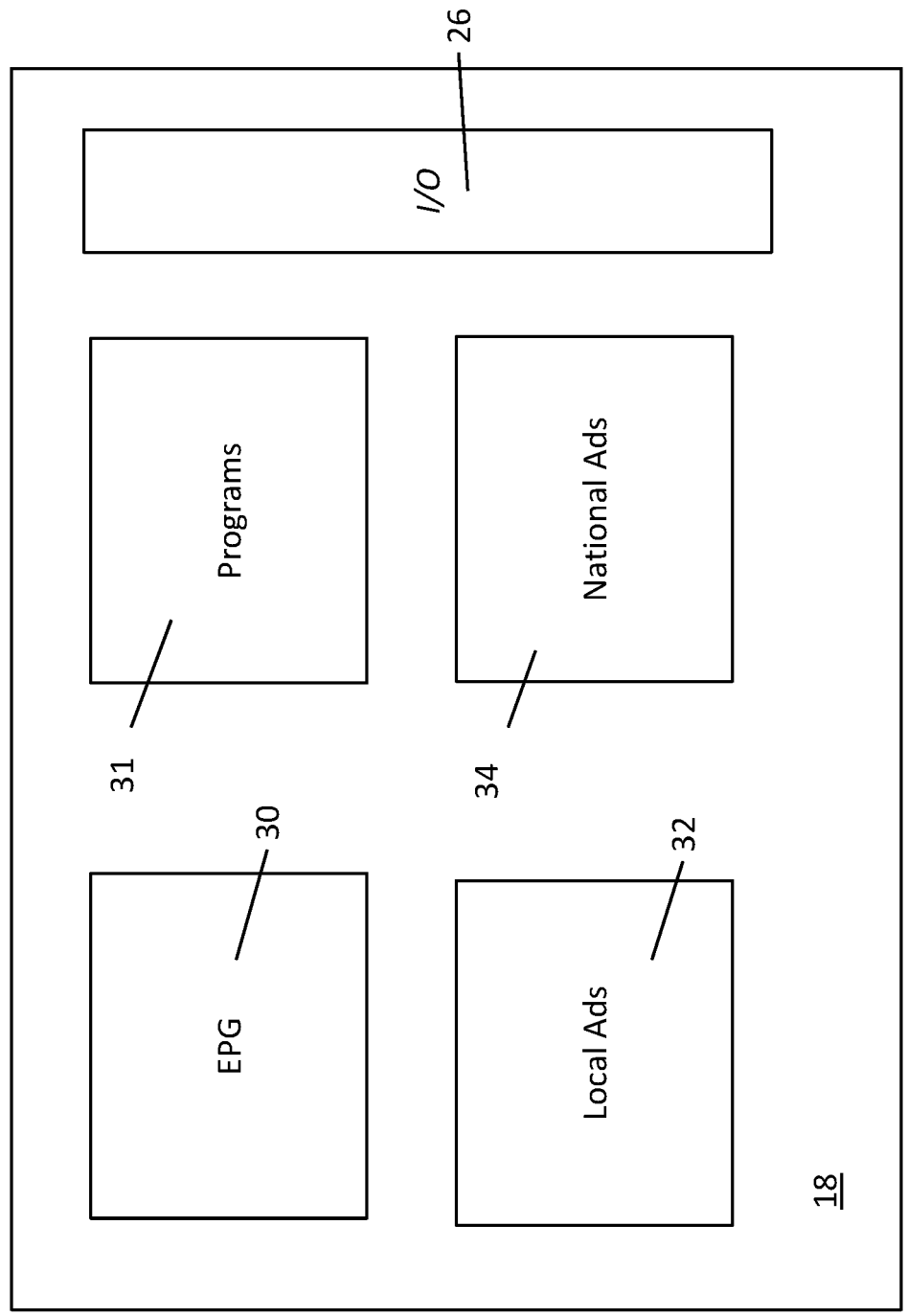
FIG. 2 is a functional block diagram of an exemplary server of the system of FIG. 1.

Illustrated in FIG. 2, there is shown an exemplary functional block diagram of a server 18. The server 18 may include an input/output port 26 for communication with other devices including the STB 14. The server 18 may also include an electronic program guide (EPG) 30. The EPG 30 may include upcoming program listings, which may, for example include sports programming scheduled in the next two weeks. The server 18 may also include storage of programs 31, either temporarily or permanent, which may be provided to viewers to watch. Local ads 32 and national ads 34 may also be included and stored in server 18. It will be understood that the configuration of server 18 is exemplary only and any or all of the functions may be distributed among multiple servers or computer networks or the STB and/or UE 16.

Creation of Vectors for Upcoming Programming.

Every sports event program has factors that can be used to describe the sporting event. By way of example only, these factors may fall into the three categories: (1) sports teams or individual athlete, for example teams such as the LA Kings hockey club or the LA Lakers basketball club or an individual athlete such as Tiger Woods; (2) the league or division, such as Major League Baseball, US Open, or NASCAR's Sprint Cup; and (3) the genre, which may, for example, be basketball, tennis or golf. It will be understood that these categories are examples only and that other categories may be defined that define a particular sporting event. Furthermore, each of these categories may include a list of individual factors within the exemplary categories of the teams, leagues and genre.

The list of factors may then be organized in the form of a vector associated with the event. For example, each specific factor may be assigned an index within the vector. These factors may be applied both to an upcoming sporting event in the electronic program guide and, as described in more detail below, the user's viewing history.

By way of example only, an upcoming sporting event may include the following factors and indices associated therewith may be created for an upcoming baseball game between the Tampa Bay Rays and the Detroit Tigers to be played in Detroit. The title in the EPG may be "Rays @ Tigers (Tigers Broadcast)", the genre is baseball, the league is the MLB, American league, central division, and the teams are the Tigers and Rays. In another example, a basketball game between the Cleveland Cavaliers and Toronto Raptors being played in Detroit may have the EPG title "Cavaliers @ Raptors", with a genre of basketball, the league is the NBA, Eastern Conference, Atlantic Division, and the teams are the Cavaliers and Raptors.

The table below shows the indices which may be assigned to each of these factors:

| Factor | Index |
|---|---|
| Rays | 0 |
| Basketball | 1 |
| Cavaliers | 2 |
| NBA | 3 |
| Eastern | 4 |
| American League | 5 |
| MLB | 6 |
| Tigers | 7 |
| Baseball | 8 |
| Atlantic | 9 |
| Raptors | 10 |
| Central Division | 11 |

These vector for the baseball game may then be calculated to be {1, 0, 0, 0, 0, 1, 1, 1, 1, 0, 0, 1} and that for the basketball game may be {0, 1, 1, 1, 1, 0, 0, 0, 0, 1, 1, 0}. It will be understood that there may be additional factors which in turn would form longer vectors. Each of the vectors is associated with the unique content ID which is converted into a list of factors. For programs in the two week guide a 1 in the index position will indicate that factor is present in the upcoming program and a 0 in the index position will indicate that factor is not present in the upcoming program. This vector may be referred to as the upcoming program vector.

Vectors for Historical Viewing.

For viewing history, a similar vector may be created. Instead of populating the vector with 0's and 1's, the value at a particular index, may, for example, represent the weighted viewing time in minutes for the time the account watched a program having that factor. This value may be represented by $T_0$. When a newly viewed sports program are to be added to the historical viewing vector, the historical viewing vector may be retrieved and the minutes watched for the newly viewed sporting event may then be added to the existing sums. In this manner, the sums of the respective factors are stored, rather than the individual program events.

Weighting and Time Decay. Not all factors associated with a given sports programs may be equal. As such, the indexed position of a factor within a vector may be weighted to account for any difference in importance to the recommendation system and method. By way of example only, the sports team or individual athlete may be given the highest weight, the league or division may be assigned the second highest weight and the genre may be assigned the lowest weight of the three main factors. In this way, the Atlanta Braves MLB baseball team program would be weighted more than the Atlanta Braves AAA baseball team. Likewise, the Atlanta Braves MLB baseball team programs would be weighted higher than the Los Angeles Dodgers MLB baseball team programs. It will be understood that these weights may vary and may, for example, vary depending on the preference of the household account or an individual user within the household account. For example, a baseball fan without an affinity for any particular baseball team may request that the genre be given more weight than the teams. Likewise, a college football fan may request that the league, i.e. NCAA or NFL, be given more weight than any team. In this way, the recommendation system and method of the present disclosure may be adjusted to fit the preferences of the user.

Additionally, factors within the historical vectors may be weighted based on a time decay. For example, the history may be limited in terms of absolute time in that any viewed programs that were viewed prior to a specific rolling time period may be excluded. For example, any viewed programs that were viewed more than 1 year prior to the present date may be dropped from the calculation. Similarly, the programs that were viewed within 1 year may be given weight based on a sliding scale in which the most recently viewed programs are weighted higher than older programs. As factors are aggregated into the customer's aggregate counts, the existing count will be scaled by the weight. Over time this will reduce the effect of old factors. In this manner, the sports recommendation system may be kept current based on evolving user interests, sports seasons, and other factors that support a time weighting factor.

In an aspect, the weighting may be applied to the minutes viewed for a program to cause older programs to count less in the vector than newer programs. The weight value specified may be a fractional multiplier of minutes viewed one year ago. This weight may be applied in a linear method where the most current weight (i.e. today's weight) is assigned a value of 1.0. If the weight is to have a 0.5 value scale, then minutes viewed one year previous may be multiplied by 0.5 before being added into the sum for a factor in the vector. This may be linearly applied based on the day the sports program was actually viewed.

Figure 3:
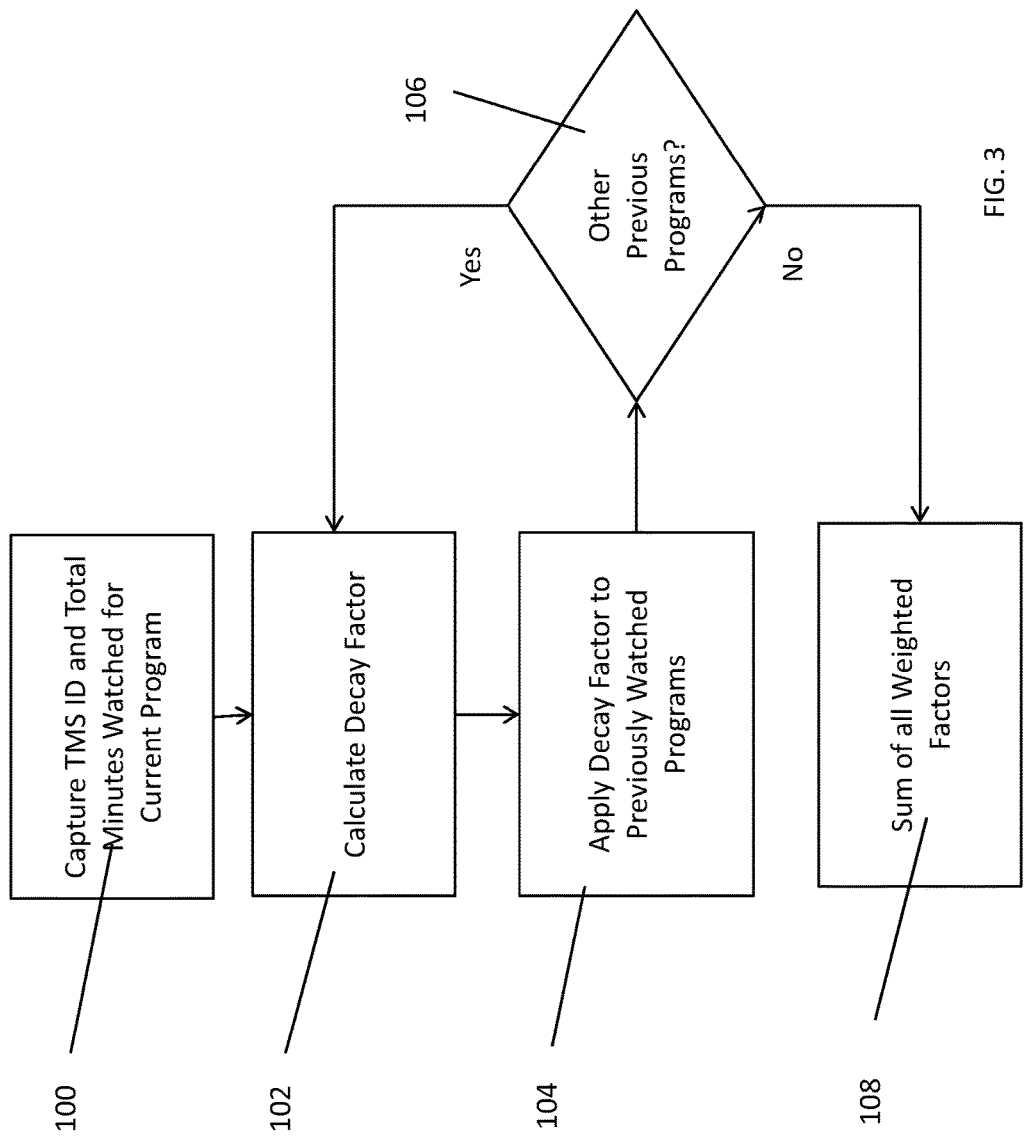
FIG. 3 is an exemplary process flow of a method of operation for the weighting functions for historical program viewing in accordance with the present disclosure.

FIG. 3 is an exemplary flow diagram in which the historical weights are applied to the factors forming a vector. At 100, the unique content ID and the minutes watched are captured for a particular sports program, referred to herein as the most recently watched program. AT 102, a delay factor is calculated for the most recently watched program based on a decay scale. As described above, the decay scale may be 0.5 over a 1 year period applied linearly over a 2 year period. This means that a program that was viewed 1 year ago would be weighted by 0.5 and programs viewed 2 years ago or more would be given zero weight. Any other decay scale may be used, for example, a 1.0 decay over 1 year applied linearly. Another example may be a geometric decay which would tend to provide even less weight to older programs than the linear decay scale would provide. At 104, the delay factor is applied to the most recently watched program by multiplying the decay factor times the number of minutes watched for that program. At 106, the question is asked whether there are other previously watched programs. If yes, the process returns to 102 to calculate the second delay factor for the second most recently watched program and at 104, the second delay factor is applied to the second most recently watched program. The process continues with respect to the third most recently watched program and continues thereafter until at 106, there are no other previously watched programs within the relevant time period. At 108, the sum of all weighted factors for relevant previously watched programs is calculated and becomes the weighted historical vector.

Assignment of Indices.

Figure 4:
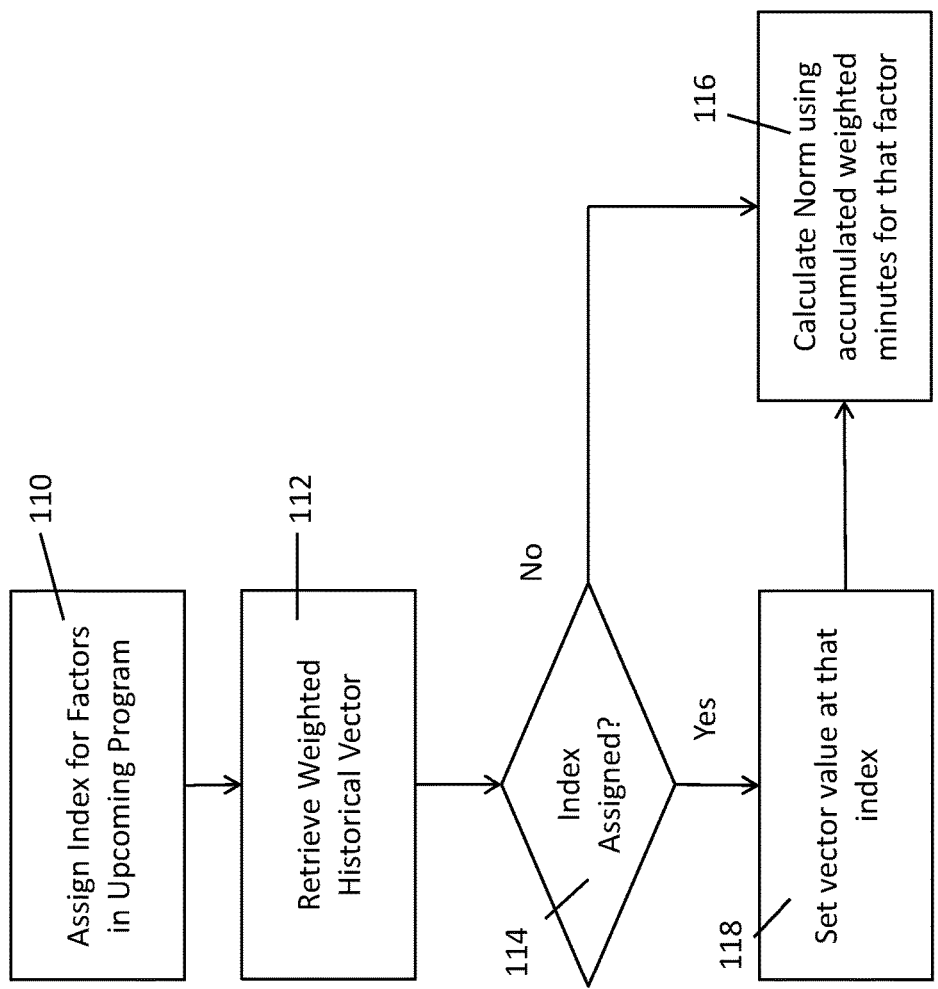
FIG. 4 is an exemplary process flow of a method of assigning indices to minimize vector length in accordance with the present disclosure.

With reference to FIG. 4, there is shown an exemplary process for assigning indices to vectors such that the length of the vectors created is minimized for computation efficiency. When assigning indices to factors, only factors found in programs in the upcoming two week guide need to be considered. At 110 these factors are first identified and then an index is assigned to each of them. Then the vectors for each of the sports programs in the upcoming two week guide are created.

With respect to the historical viewing history, the weighted historical vector is retrieved at 112. At 114, for each factor in the historical viewing history, it is determined whether an index was assigned for that factor. If an index was not assigned, then at 116, the factors' minute value is accumulated and used for calculation of the norm. If an index was assigned at 114, then in addition to accumulating its value into the norm at 116, the weighted historical vector value is set at that index at 118. In this way, the length of the vector for every account will be set at the maximum number of factors available for the upcoming programs in the two week guide, thereby reducing the computation cost of the dot product in the cosine similarity calculations.

Similarity Calculation of Vectors.

Once each of the upcoming programming vectors and weighted historical vectors has been defined, then a similarity calculation may be performed. For example, for an upcoming program for a Boston Red Sox v. Baltimore Orioles baseball game, a simplified vector may be derived with the factors such as Teams: Red Sox and Orioles, Leagues, MLB, American League East, Genre baseball. Each of these factors may be assigned an index, in which Red Sox would be positioned at index 1, Orioles, 2, MLB 3, American League East 4, and baseball 5. The upcoming program vector would be {1, 1, 1, 1, 1}. A viewer watching this game for 30 minutes, the unweighted vector would be {30, 30, 30, 30, 30}. It will be understood that this simplified example would become more complex as more sporting events were watched. The vector may get longer and include more minutes from different sporting events and may, in fact, be longer based on the number of sporting events watched and the factors for each sporting event.

The index for factors may be chosen by collecting all the factors in a user account and the factors in the upcoming two week guide. The factors may then be chosen and assigned an index. The process may be performed each time a calculation is requested without storing the vectors permanently. This would reduce storage requirements and permit the ordering of factors to be changed from time to time or, for example, each time a calculation is performed.

In an aspect, regardless of the length of the vectors, the weighted historical vector B and the upcoming programming vector A may be compared using, for example, a cosine similarity. One can think of the cosine similarity as looking at the magnitude of the angle between two vectors.

$$\text{cosine similarity} = \frac{A \cdot B}{\|A\| * \|B\|}$$

In this equation, the numerator A·B represents the dot product of the two vectors A and B. The dot product may be represented by:

$$A \cdot B = \sum_{i=0}^{n} a_i * b_i$$

The symbols $\|A\|$ and $\|B\|$ represents the length or norm of the vector. In an aspect, the L2 norm, i.e., the square root of the sum of the absolute values squared may be used. Using this method for the programs in the two week guide, the vector indices would have the weights associated with the categories. So the results will be the dot product with the weights applied to each factor divided by the square root of the sum of squares of the weights for the program factors. In an optimization calculation, the L2 norm of the vectors may be calculated and stored in a combined vector with norm object to be used in subsequent calculations. Because the cosine similarity may be calculated for every program in the upcoming guide, storing the norms for the vectors which do not change may be more efficient.

As a result, the cosine similarity produces a single numerical score for the account for each upcoming program in the two week EPG.

It will be understood that the calculation of cosine similarities for every account may take significant computational time and resources. In order to reduce this time, the length of the vectors may be reduced. For example, if it is not football season, then all the football teams, leagues and genre will not exist in the vectors for upcoming programs. Since the numerator for the cosine similarity is the dot product, all the factors that do not exist in the two week guide will contribute zero to the dot product's sum. For factors that do not exist in the two week guide, all the $b_i$ will be zero. So when forming the customer account vector we can ignore these factors while still including them in the calculation of the norm.

Figure 5:
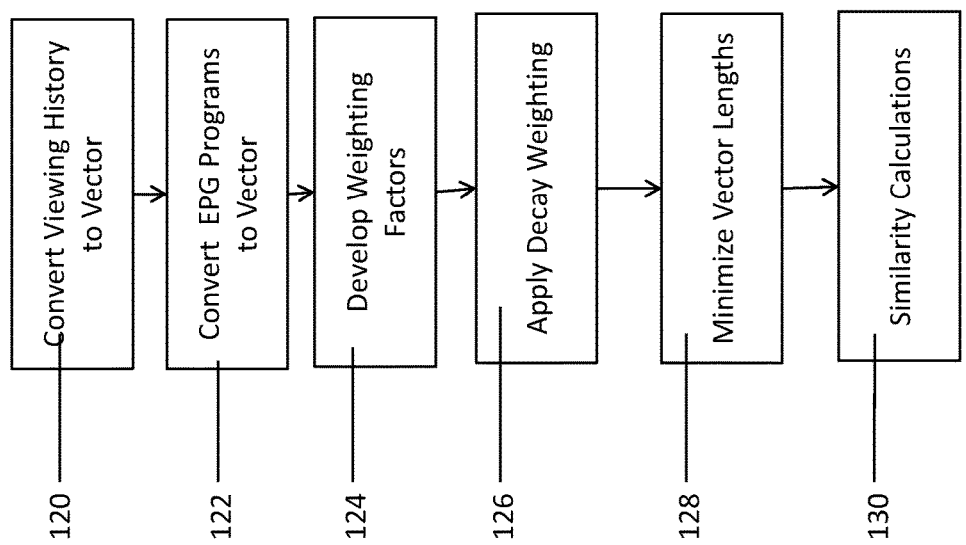
FIG. 5 is an exemplary process flow of a method of operation for the similarity calculation functions in accordance with the present disclosure.

This process is summarized in the flow diagram of FIG. 5. At 120, the viewing history is converted into a vector. At 122, each of the upcoming sports programs in the electronic program guide is converted to a vector. At 124, weighting factors are developed. At 126, the time decay factors are applied to the weighted factors. At 128, the vector lengths are minimized for computational efficiency. At 130, the similarity calculations are performed.

Sorting the Scored Programs.

In an aspect, taking the cosine similarity values and sorting on that to provide a recommendation may be used. However, that may not be sufficient for the best recommendations for a user. For example, users may have a single sport that they watch more than any other sport and simply sorting on the cosine similarity will yield only that sport in a top N display, in which N is the number of recommendations to be displayed.

In an aspect, the programs may be sorted in accordance with the following description such that a display of N number of programs may be divided by the ratio of watched sports genres. For example, if a user watches 50% football, 25% soccer and the rest spread among the remaining other genres, then it may be decided that 0.5 N programs in the display would be football programs, 0.25 N programs in the display would be soccer programs, and 0.25 N programs in the display would be other sports genres. Thus, in an aspect, the recommendation display may be by genre and then by the cosine similarity score within each genre to ensure that the top watched teams are near the top of the list within each genre.

Figure 6:
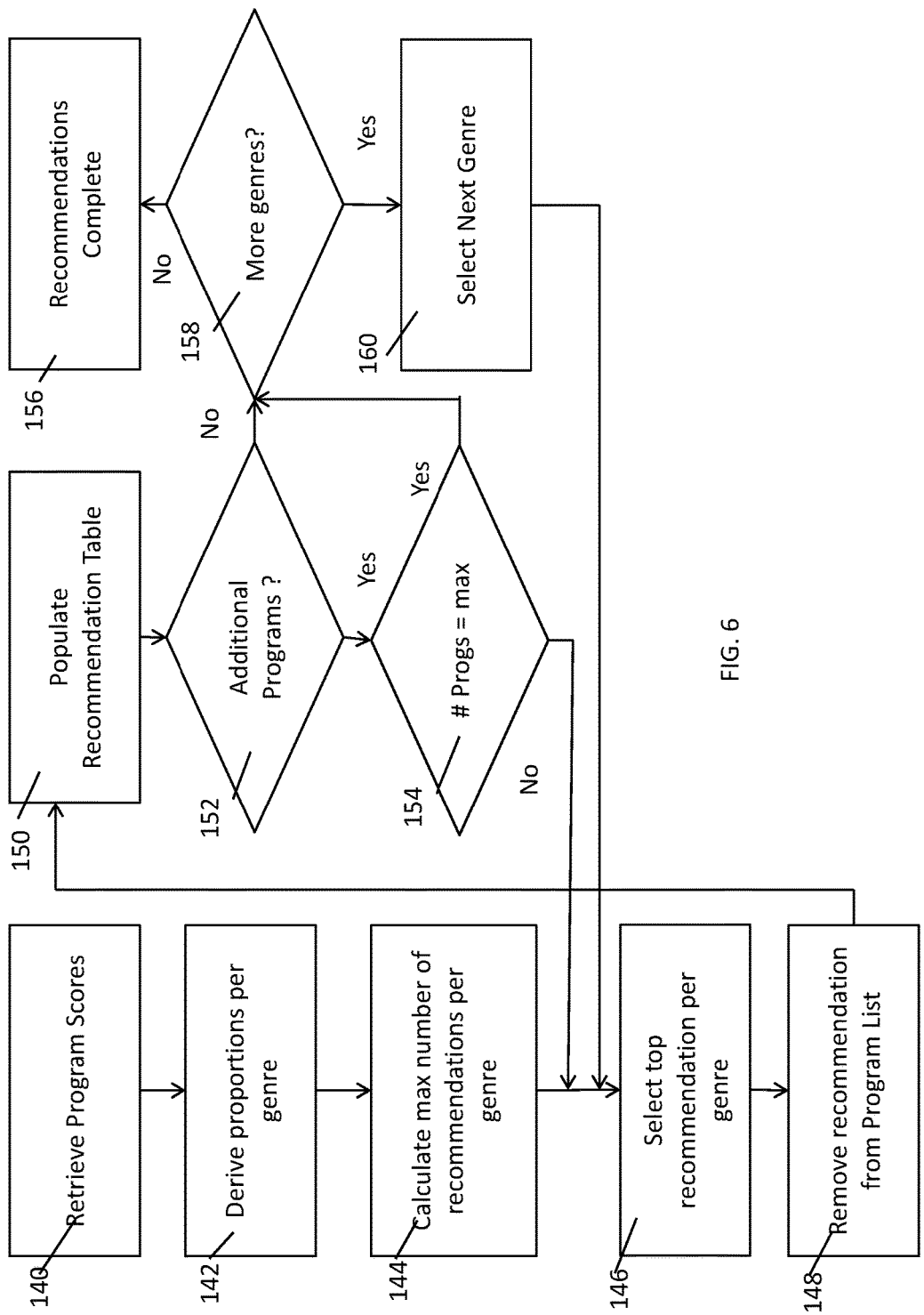
FIG. 6 is an exemplary process flow of a method of operation for the recommendation display functionality in accordance with the present disclosure.

With reference to FIG. 6, at 140 the cosine similarity scores are retrieved. At 142, historical genre factors and minutes watched are gathered and the proportion of minutes watched for each genre is derived. For example, if 50% of the minutes watched are baseball events, then the baseball genre would have a 505 proportion. Using the derived proportion and the total count to be included in the display, the number of recommended programs for each genre is calculated at 144. The method proceeds at 146 where, for the top genre, the first recommendation for that genre is selected and removed from the program list at 148. At 150, that selected program is inserted into the recommendation table as the first selection. At 152, there is a determination as to whether additional programs in the upcoming program guide are available. If so, the question is presented at 154 whether the number of programs selected for recommendation is equal to the maximum number of recommendations per genre previously calculated at 144. If not, then the process continues at 146 where the top remaining recommendation for the genre is selected, removed at 148 and populated into the display at 150.

Continuing at 152, if there are no additional programs in the program guide for that genre, then the inquiry is made at 158 as to whether there are more genres. If so, then the next genre is selected at 160 and the process continues at 146 with respect to the top recommendations for that genre. If there are no more genres available at 158, the recommendation process and display associated therewith is complete.

If there are additional programs in the genre at 154 but the number of recommended programs is equal to the maximum number of recommendations for that genre, then the process continues at 158 for the next or any remaining genres. The process repeats until the recommendation display is fully populated or there are no other relevant upcoming programs to recommend.

The following table illustrates an exemplary embodiment of a recommendation display.

| Title | Content ID | Score | Genre | Team | League |
|---|---|---|---|---|---|
| Phillies @ Cardinals | SP003373680000 | 0.6290296207 | Baseball | 259, Cardinals 254, Phillies | 2002, National League 2008, Central Division 2000, MLB |
| Phillies @ Cardinals | SP003373850000 | 0.6290296207 | Baseball | 259, Cardinals 254, Phillies | 2002, National League 2008, Central Division 2000, MLB |
| Pirates @ Cardinals | SP003374210000 | 0.6276877584 | Baseball | 259, Cardinals 255, Pirates | 2002, National League 2008, Central Division 2000, MLB |
| Pirates @ Cardinals | SP003374090000 | 0.6276877584 | Baseball | 259, Cardinals 255, Pirates | 2002, National League 2008, Central Division 2000, MLB |
| Pirates @ Cardinals | SP003374370000 | 0.6276877584 | Baseball | 255, Pirates 259, Cardinals | 2002, National League 2008, Central Division 2000, MLB |
| Giants @ Reds | SP003373760000 | 0.5854570718 | Baseball | 258, Giants 240, Reds | 2002, National League 2008, Central Division 2000, MLB |
| Nationals @ Cubs | SP003374030000 | 0.5842544593 | Baseball | 263, Nationals 238, Cubs | 2002, National League 2008, Central Division 2000, MLB |
| Nationals @ Cubs | SP003374230000 | 0.5842544593 | Baseball | 263, Nationals 238, Cubs | 2002, National League 2008, Central Division 2000, MLB |
| Stars @ Blues | EP000195595583 | 0.4045588372 | Hockey | 1758, Blues 1765, Stars | 6006, Central 6000, NHL 6005, Western |
| Blues @ Stars | EP000195595585 | 0.4045588372 | Hockey | 1758, Blues 1765, Stars | 6006, Central 6000, NHL 6005, Western |

-continued

| Title | Content ID | Score | Genre | Team | League |
|---|---|---|---|---|---|
| Stars @ Blues | EP000195595584 | 0.4045588372 | Hockey | 1758, Blues 1765, Stars | 6006, Central 6000, NHL 6005, Western |
| Sharks @ Predators | EP000195595590 | 0.3462637797 | Hockey | 1768, Sharks 1757, Predators | 6006, Central 6000, NHL 6005, Western |
| Trail Blazers @ Warriors | EP000191483277 | 0.1853668894 | Basketball | 306, Trail Blazers 290, Warriors | 4007, Pacific 4000, NBA 4005, Western |
| Heat @ Raptors | EP000191483262 | 0.1771638064 | Basketball | 309, Raptors 295, Heat | 4002, Atlantic 4001, Eastern 4000, NBA |
| Heat @ Raptors | EP000191483263 | 0.1771638064 | Basketball | 309, Raptors 295, Heat | 4002, Atlantic 4001, Eastern 4000, NBA |
| Raptors @ Heat | EP000191483264 | 0.1768726476 | Basketball | 309, Raptors 295, Heat | 4001, Eastern 4000, NBA 4004, Southeast |
| Raptors @ Heat | EP000191483265 | 0.1768726476 | Basketball | 309, Raptors 295, Heat | 4001, Eastern 4000, NBA 4004, Southeast |
| PGA Tour Golf | EP005544725222 | 0.1480893352 | Golf | | 1000, PGA |
| PGA Tour Golf | EP005544725237 | 0.1480893352 | Golf | | 1000, PGA |

There may be variations of the above described system and methods that fall within the scope of the present disclosure and appended claims. For example, if the similarity calculations are below a certain threshold, the upcoming program may not be recommended, even if there are additional entries available for the display. In this manner, the relative rankings of programs may still be performed, but the actual value of the comparison may also be used as a factor in the recommendation.

Likewise, the disclosure may be applicable for a particular account, i.e., a household. Additionally, the household account may be subdivided into individual user accounts, with the individual user's historical viewing habits used in the calculations. In this way, a wife may prefer college football programs generally and West Virginia University football in particular, while the husband may prefer to watch Atlanta Braves baseball. By segregating into individual user accounts, the recommendation system and method would be tailored for each.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

While example embodiments have been described in connection with various computing devices/processors, the underlying concepts can be applied to any computing device, processor, or system capable of performing the processing as described herein. The methods and apparatuses of the present disclosure, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include server 40, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:

Receiving, by a server, a request for sports programming recommendation;

responsive to the receiving step, determining, by the server an upcoming program vector and a weighted historical vector wherein the weighted historical vector is determined by gathering a history the watched programs wherein the watched programs comprise a plurality of types of watched programs, summing the amount of time each type of watched program was viewed, and applying a decay factor to each type of the watched programs based on the time since each type of the watched programs was viewed;

performing, by the server, a similarity calculation comparing the upcoming program vector and the weighted historical vector to derive a recommendation score; and generating, by the server, a recommendation based on the recommendation score.

2. The method of claim 1 further comprising determining, by the server, a plurality of upcoming program vectors and wherein the performing step comprises comparing each of the plurality of upcoming program vectors to the weighed historical vectors and the generating step includes generating a plurality of recommendation scores.

3. The method of claim 2 further comprising ranking, by the server, the plurality of recommendation scores and wherein the recommendation comprises recommending a highest of the plurality of recommendation scores.

4. The method of claim 1 further comprising identifying, by the server, a genre for each of a plurality of upcoming programs and determining, by the server, an upcoming program vector for each of the plurality of upcoming programs and wherein the performing steps comprises comparing the plurality of upcoming program vectors to the weighted historical vector and wherein the generating step comprises generating a plurality of recommendation scores.

5. The method of claim 4 further comprising determining, by the server, a percentage for each genre based on an amount of viewing time for each genre compared to a total viewing time for all genres and ranking each genre in accordance with the percentage.

6. The method of claim 5 further wherein the recommendation score is used to rank upcoming programs within each genre.

7. The method of claim 6 wherein a number of recommendations for each genre is determined based on a total number of recommendations and the percentage.

8. The method of claim 5 further comprising displaying, by the server, a total number of recommendations wherein each upcoming program is ranked according to the genre and the recommendation score within each genre.

9. A server comprising:

an input/output system for communicatively coupling the server to an input device and a storage source;

a processor communicatively coupled to the input/output system; and memory storing instructions that cause the processor to effectuate operations, the operations comprising:

receiving a request for sports programming recommendation;

responsive to the receiving step, determining an upcoming program vector and a weighted historical vector wherein the weighted historical vector is determined by gathering a history the watched programs wherein the watched programs comprise a plurality of types of watched programs, summing the amount of time each type of watched program was viewed, and applying a decay factor to each type of the watched programs based on the time since each type of the watched programs was viewed;

performing a similarity calculation comparing the upcoming program vector and the weighted historical vector to derive a recommendation score; and generating a recommendation based on the recommendation score.

10. The server of claim 9 wherein the operations further comprises determining a plurality of upcoming program vectors and wherein the performing step comprises comparing each of the plurality of upcoming program vectors to the weighed historical vectors and the generating step includes generating a plurality of recommendation scores.

11. The server of claim 10 wherein the operations further comprises ranking the plurality of recommendation scores and the recommendation comprises recommending a highest of the plurality of recommendation scores.

12. The server of claim 9 wherein the operations further comprising identifying a genre for each of a plurality of upcoming programs and determining an upcoming program vector for each of the plurality of upcoming programs and wherein the performing steps comprises comparing the plurality of upcoming program vectors to the weighted historical vector and the generating step comprises generating a plurality of recommendation scores.

13. The server of claim 12 wherein the operations further comprises determining a percentage for each genre watched based on an amount of viewing time for each genre compared to a total viewing time for all genres and ranking each genre in accordance with the percentage.

14. The server of claim 13 wherein the operations wherein the recommendation score is used to rank upcoming programs within each genre.

15. The server of claim 14 wherein a number of recommendations for each genre is determined based on a total number of recommendations and the percentage.

16. The server of claim 13 wherein the operations further comprises displaying a total number of recommendations wherein each upcoming program is displayed according to the genre and the recommendation score within each genre.

17. A method comprising:

determining a total number of upcoming programs to be displayed;

calculating a percentage based on a genre associated with each of the upcoming programs and a sum of historical minutes watched of each genre;

allocating a number of upcoming programs per genre to be displayed per genre based on the percentage;

displaying the total number of upcoming programs ranked in accordance with the historical minutes watched of each genre.

18. The method of claim 17 further comprising creating an upcoming program vector for each of the upcoming programs and a weighted historical vector wherein the weighted historical vector is determined by gathering a history the watched programs wherein the watched programs comprise a plurality of types of watched programs, summing the amount of time each type of watched program was viewed, and applying a decay factor to each type of the watched programs based on the time since each type of the watched programs was viewed; and performing a similarity calculation comparing each of the upcoming program vectors to the weighted historical vector to generate a recommendation score.

19. The method of claim 18 wherein the recommendations scores are ranked highest to lowest within each genre to establish a genre ranking and the displaying step comprises displaying the number of upcoming programs per genre in accordance with the percentage and the genre ranking.

* * * * *